United States Patent
Szajnowski (10) Patent No.: US 7,515,506 B2
(45) Date of Patent: Apr. 7, 2009

(54) DETERMINATION OF TIME-DIFFERENCE OF ARRIVAL AND ANGLE OF ARRIVAL

(75) Inventor: Wieslaw Jerzy Szajnowski, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 365 days.

(21) Appl. No.: 11/127,271

(22) Filed: May 12, 2005

(65) Prior Publication Data

US 2006/0280032 A1    Dec. 14, 2006

(30) Foreign Application Priority Data

May 13, 2004    (EP) .................................. 04252785

(51) Int. Cl.
*G01S 3/80* (2006.01)
(52) U.S. Cl. ....................... 367/127; 367/124
(58) Field of Classification Search ................ 367/123, 367/124, 127; 702/79, 176
See application file for complete search history.

(56) References Cited

U.S. PATENT DOCUMENTS

| | | | | |
|---|---|---|---|---|
| 4,097,801 A | * | 6/1978 | Freeman et al. | 368/120 |
| 4,468,746 A | * | 8/1984 | Davis | 702/178 |
| 4,613,951 A | * | 9/1986 | Chu | 702/176 |
| 5,982,712 A | * | 11/1999 | Smith | 368/120 |
| 6,539,320 B1 | | 3/2003 | Szajnowski et al. | |
| 2002/0131035 A1 | | 9/2002 | Watanabe et al. | |

OTHER PUBLICATIONS

W.J. Szajnowski and P.A. Ratliff, "Implicit Averaging and Delay Determination of Random Binary Waveforms," IEEE Signal Processing Letters, 9, 193-195, Jul. 2002.

* cited by examiner

*Primary Examiner*—Ian J Lobo
(74) *Attorney, Agent, or Firm*—Birch, Stewart, Kolasch & Birch, LLP (57) ABSTRACT

The delay between two signals is determined by obtaining zero crossings from each signal, and using each crossing to trigger the sampling of the other signal. Two samples are taken in response to each zero crossing, and the difference between those two samples is calculated. This difference is summed for each event and both signals to derive a value. The process is repeated for different delays between the first and second signals. The values are examined to determine the delay which corresponds to the greatest coincidence between the signals.

11 Claims, 8 Drawing Sheets

Prior art

DETERMINATION OF TIME-DIFFERENCE OF ARRIVAL AND ANGLE OF ARRIVAL

BACKGROUND OF THE INVENTION

1. Field of the Invention

This invention relates to a method and apparatus for determining the relative time delay between two wideband signals, and is particularly but not exclusively applicable to estimating the line-of-bearing of a non-cooperative source of acoustic energy by determining the delay between two replicas of a wideband signal generated by the source and captured by a pair of collocated sensors.

2. Description of the Prior Art

There are many circumstances in which there is a need to detect and localize a noncooperative object of interest in some specified surveillance area. Such tasks can be performed by suitable active or passive sensors which can extract useful information by collaborative processing of signals reflected or emitted by that object.

In contrast to applications employing active sensors, such as radar or active sonar, in which the surveillance region of interest is illuminated by an interrogating energy waveform to obtain object-backscattered returns, passive sensors capture only object-generated signals (or object-influenced signals from separate sources). For example, the movement of people, vehicles, speedboats or vibrating machinery can all generate wideband acoustic signals, which can be exploited for object detection and localization.

As will be described in more detail below, an example in which object detection and localization is useful is that of security surveillance with a network of distributed acoustic sensors. When an object of interest, such as a vehicle, has been detected and localized, the estimated object position can be utilized by security cameras for aiming and zooming, in order to enhance the quality of recorded images. Such systems may be installed for monitoring purposes in industrial environments, e.g. to offer improved continuous surveillance of critical infrastructure, including power grids, power plants, gas and oil pipelines and water supply systems.

Another application is that of coastguard or littoral surveillance in which speedboats and other surface vessels of interest can be detected and localized by a network of floating buoys employing acoustic sensors.

In addition to the above surveillance and reconnaissance applications, in multimedia applications distributed microphone networks are capable of enhancing audio signals for improved intelligibility, and cuing for camera aiming.

Object-generated acoustic signals are classified as wideband signals since the ratio of their highest frequency component to lowest frequency component is relatively large. For example, for the audio range, 30 Hz to 15 kHz, the ratio is 500. In a case of motorized vehicles, dominant frequency components may range from 20 Hz to 2 kHz, resulting in a ratio of 100.

When the distance between an acoustic source and the sensors is large, the direction of wave propagation is approximately equal at each sensor (the far-field condition), and the propagating field consists of planar waves. Thus, for a far-field source, the angle of arrival (AOA) or direction-of-arrival (DOA) in the coordinate system of the sensors can be estimated directly from the relative delays of signals captured by sensors at different locations. Such relative delay is commonly referred to as the time-difference of arrival, or simply TDOA.

The angle of arrival (AOA) measurement restricts the location of the source along a line at the estimated angle of arrival (AOA). When multiple angle of arrival (AOA) measurements are made simultaneously by multiple spatially-separated sensors, a triangulation method may be used to determine the location of the source at the intersection of these lines-of-bearing.

Figure 1:
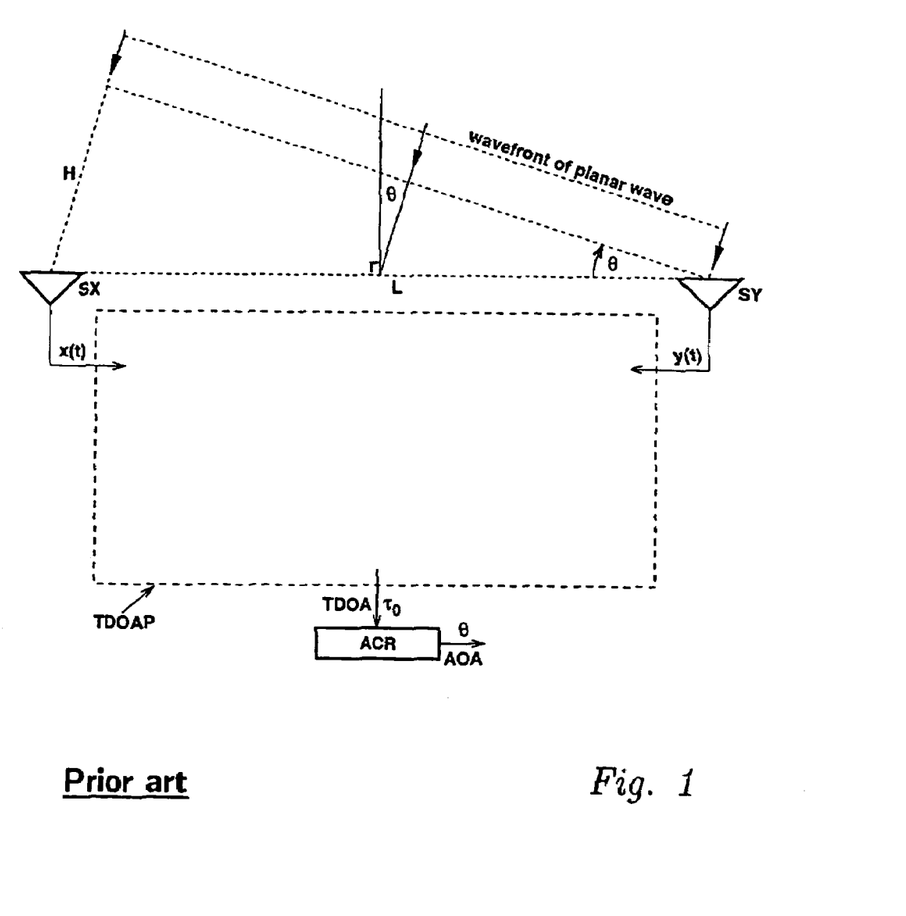
FIG. 1 illustrates schematically a method of determining the angle of arrival θ from the time-difference of arrival $\tau_0$ supplied by a conventional correlation-based processor TDOAP.

FIG. 1 illustrates schematically a method of determining the angle of arrival $\theta$ from the time-difference of arrival (TDOA). As shown, a planar wave generated by a remote acoustic source reaches sensor SY first, and then sensor SX. From geometrical considerations, it follows that the angle of arrival (AOA) $\theta$ can be calculated from $$\theta = \arcsin\left(\frac{H}{L}\right) = \arcsin\left(\frac{\tau_0 v_s}{L}\right)$$

where L is the distance between sensors, H represents the additional path length to sensor SX as referenced to sensor SY, $\tau_0$ is the time-difference of arrival (TDOA), and $v_s$ is the speed of sound.

For the purpose of angle of arrival (AOA) determination, a required time-difference of arrival (TDOA) estimate needs to be obtained from two signals, $x(t)$ and $y(t)$, captured by sensors SX and SY, respectively, where $$x(t)=s(t)+n_x(t) \quad y(t)=s(t-\tau_0)+n_y(t)$$

where $s(t)$ is an object-generated signal, $\tau_0$ denotes the time-difference of arrival (TDOA), and waveforms $n_x(t)$ and $n_y(t)$ represent background noise and other interference.

In the example shown in FIG. 1, the value $\tau_0$ is provided by a time-difference of arrival processor (TDOAP) crosscorrelating the wideband signals $x(t)$ and $y(t)$ captured by the sensors, i.e. by performing the operation $$R_{xy}(\tau) = \frac{1}{T} \int_0^T x(t-\tau) y(t) dt$$

where the integral is evaluated over the observation interval of duration T and for a range, $-|\tau_{max}|<\tau<|\tau_{max}|$, of time-difference of arrival (TDOA) values of interest. The value of argument $\tau$ that maximizes the crosscorrelation function $R_{xy}(\tau)$ provides an estimate of an unknown time-difference of arrival (TDOA).

The value of the time-difference of arrival (TDOA) supplied by the time-difference of arrival processor (TDOAP) is converted into a corresponding angle of arrival (AOA) $\theta$ by an angle calculator (ACR), which may, for example, be implemented in the form of a suitable look-up table stored in a read-only memory.

Acoustic signals emitted by objects of interest, in addition to occupying a wide frequency range, also manifest a nonstationary and chaotic nature with identifiable intermittent transients. As a result, many conventional crosscorrelation techniques based, explicitly or implicitly, on the assumptions of signal stationarity and noise Gaussianity are only of limited practical use. Furthermore, most practical implementations have to deal with discrete-time samples, so that the optimization procedures and performance analyses carried out in the continuous-time framework cannot be fully applicable.

U.S. Pat. No. 6,539,320 discloses a robust method for determining the delay between a primary reference signal and its time-delayed replica. In the following, the disclosed method will be referred to as "crosslation", and a system implementing the method will be referred to as a "crosslator". The contents of U.S. Pat. No. 6,539,320 are incorporated herein by reference. A crosslation technique involves using events (such as zero crossings) from one signal to sample the other signal. The events occur at irregular intervals, and are preferably at least substantially aperiodic. The samples are combined to derive a value which represents the extent to which the sampling coincides with features of the second signal corresponding to the events. By repeating this process for different delays between the first and second signals, it is possible to find the delay which gives rise to the value representing the greatest coincidence of events, i.e. the delay between the two signals.

In the example described in the above disclosure, a nondeterministic signal x(t) is subjected to an unknown delay to produce a signal y(t), and a reference version of the signal x(t) is examined to determine the time instants at which its level crosses zero, either with a positive slope (an upcrossing) or with a negative slope (a downcrossing). The time instants of these crossing events are used to obtain respective segments of the signal y(t), the segments having a predetermined duration. The segments corresponding to zero upcrossings are all summed, and the segments corresponding to zero downcrossings are all subtracted from the resulting sum. A representation of such segment combination is then examined to locate a feature in the form of an S-shaped odd function. In the following, the S-shaped odd function will be referred to as the crosslation function.

Figure 3:
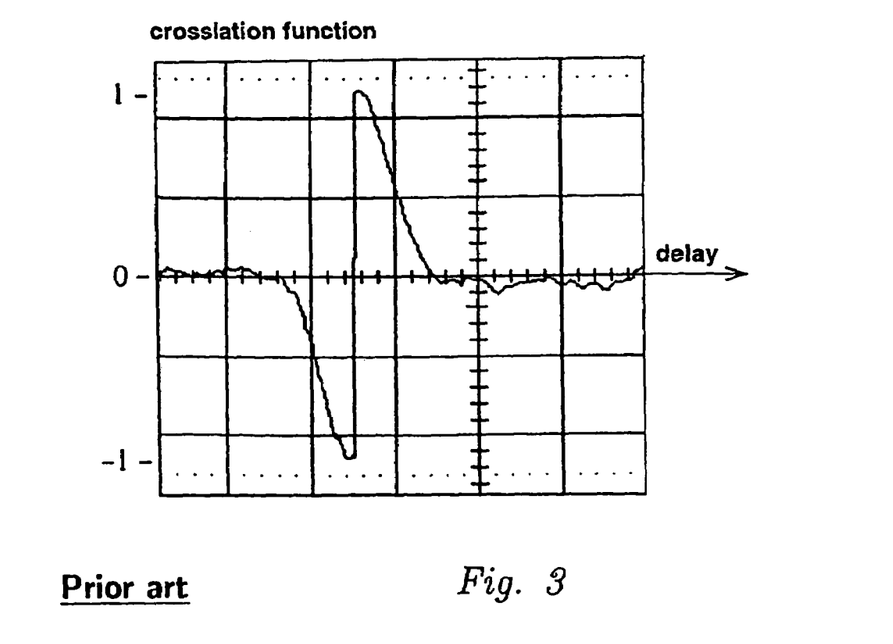
FIG. 3 depicts an example of a crosslation function obtained experimentally by processing a random binary waveform and its time-shifted replica.

The position within the representation of a zero-crossing in the centre of the crosslation function represents the amount of the mutual delay between the two signals being processed. FIG. 3 shows an example of an S-shaped crosslation function obtained experimentally by processing a random binary waveform and its time-delayed replica.

Figure 2:
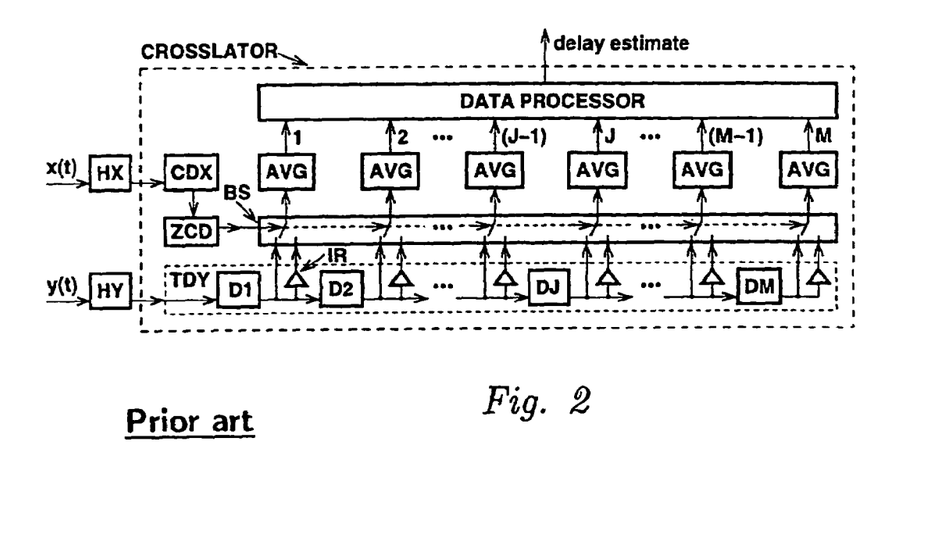
FIG. 2 shows an example of a crosslator used to determine the delay between two input signals.

FIG. 2 shows one possible example of exploiting the concept of crosslation to construct a system capable of determining the delay between a nondeterministic signal x(t) and its time-delayed replica y(t). The signal y(t) is the sum of noise $n_y(t)$ and the signal x(t) attenuated by the factor of $\alpha$ and delayed by $\tau_0$, hence $$y(t)=\alpha x(t-\tau_0)+n_y(t)$$

As shown in FIG. 2, the signal y(t) is converted by a hard limiter HY into a corresponding binary bipolar waveform which is applied to the input of a tapped delay line TDY. The delay line TDY comprises a cascade of M identical unit-delay cells D1, D2, ..., DJ, ..., DM. Each cell provides a suitably delayed output signal and also its polarity-reversed replica supplied by inverter IR.

The parallel outputs of the tapped delay line TDY are connected through a bank of switches BS to M averaging or integrating units AVG that accumulate data supplied by the tapped delay line TDY. The switches, normally open, are closed when a suitable signal is applied to their common control input. The time interval during which the switches are closed should be sufficiently long so that each new incremental signal sample can be acquired with minimal loss.

The time instants, at which the switches are closed and new data supplied to the averaging units, are determined by a zero-crossing detector ZCD that detects the crossings of zero level of a binary waveform obtained from the reference signal x(t) processed by a hard limiter HX; the resulting binary waveform is then delayed by a constant-delay line CDX. The value of the constant delay is equal to or greater than the expected maximum value of time delay to be determined. It should be pointed out that the averaging units receive the incremental input values from the tapped delay line TDY in a non-uniform manner, at the time instants coinciding with zero crossings of the delayed reference signal x(t).

Each time a zero upcrossing occurs, there appears transiently at the inputs of the averaging units a replica of a respective segment of the binary waveform obtained from the signal y(t). Similarly, each time a zero downcrossing occurs, there appears transiently at the inputs of the averaging units a reversed-polarity replica of a respective segment of the binary waveform obtained from the signal y(t). The averaging units thus combine the two groups of these segments to produce a representation of a combined waveform, like that of FIG. 3.

The signals obtained at the outputs of the averaging units AVG are used by the data processor. The operations performed by the data processor are so defined and structured as to determine the location of the zero crossing situated between the two opposite-polarity main peaks exhibited by the resulting S-shaped crosslation function. The location of this zero crossing corresponds to the time delay between the signals x(t) and y(t). A set of suitable operations and their sequence can be constructed by anyone skilled in the art.

In order to simplify the structure of a crosslator system, instead of using both upcrossings and downcrossings, the reference version of a wideband non-deterministic signal x(t) can be examined to determine the time instants of zero upcrossings (or downcrossings) only. However, irrespective of the particular arrangement used, a crosslation-based technique always includes a step of determining the time instants at which a reference signal crosses a predetermined threshold. Those specific time instants are also referred to as significant events. In a hardware implementation of crosslation significant events define the time instants at which suitable trigger pulses are generated.

The crosslation techniques of U.S. Pat. No. 6,539,320 for time-delay determination are robust and particularly useful for processing non-Gaussian signals. However, crosslation in the disclosed form is not well suited to time-difference of arrival (TDOA) determination.

It would therefore be desirable to provide a method and an apparatus for determining time-difference of arrival (TDOA) in a more efficient way than that provided by the prior art techniques.

It would also be desirable to provide a time delay measurement technique which is less subject to noise, and more suited to detecting angle of arrival than prior art arrangements.

SUMMARY OF THE INVENTION

Aspects of the present invention are set out in the accompanying claims.

In accordance with a further aspect of the invention, the delay between two signals is determined by performing a first crosslation operation in which significant events (occurring at non-uniform intervals) derived from the first of the signals are used to sample the second signal, and a second crosslation operation in which significant events (also occurring at non-uniform intervals) derived from the second signal are used to sample the first signal. The derived samples from both signals are combined to obtain a value, and the entire process is repeated for different delays introduced between the first and second signals. The different values thus obtained are examined to find the delay giving rise to the greatest degree of coincidence between the events which trigger the sampling, and the samples-corresponding to those events.

By performing two concurrent crosslation operations, one on each signal, it is possible to mitigate the effects of noise in each signal, so long as the noise components in the two signals are mutually uncorrelated. Therefore, the technique is particularly useful in situations in which the two signals are subject to noise, e.g. in passive systems where there are two (or more) sensors which sense object-generated or object-influenced signals, and therefore where there is no available interrogating signal. The invention is also particularly useful in situations in which the sensors are relatively proximate, such as in the device where two sensors are at fixed locations relative to each other for determining angle of arrival.

According to a further, independent aspect of the present invention, a crosslation technique involves using the significant events of one signal to trigger the capturing of two time-separated samples from the other signal. The difference between the two samples is taken, and the differences, corresponding to the respective events, are summed. The resulting value varies in dependence upon whether there is significant correspondence between the sampling events and the portions of the sampled signal corresponding to those events. The process is repeated for different values of the delay introduced between the first and second signal, to determine the delay for which the degree of coincidence is greatest.

This technique involves looking at relative changes in the "crosslation function", rather than its absolute value, which is approximately the same as looking at the time derivative of the crosslation function. Such a technique emphasizes the portion of the crosslation function which corresponds to the time delay to be determined. Accordingly, this unknown time delay can be determined in a more convenient and precise manner.

BRIEF DESCRIPTION OF THE DRAWINGS

Arrangements embodying the invention will now be described by way of example with reference to the accompanying drawings, in which.

DETAILED DESCRIPTION OF THE PREFERRED EMBODIMENTS

Figure 4:
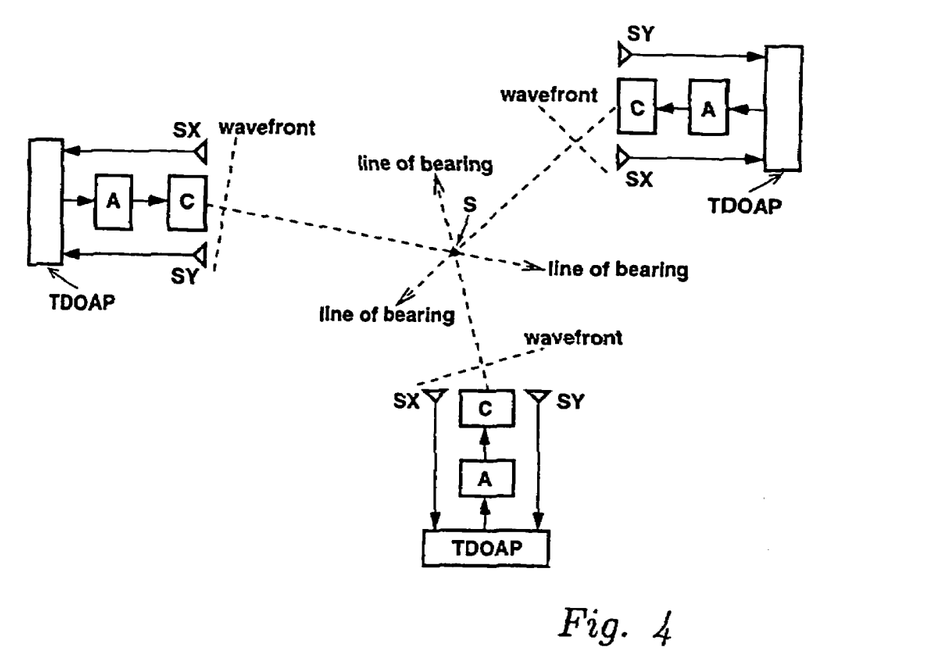
FIG. 4 illustrates an example of surveillance apparatus which exploits the present invention.

FIG. 4 depicts an example of a possible surveillance scenario in which the present invention can be exploited. In this specific case, a surveillance network utilizes three units, each comprising a security camera C, driven by an angle-calculator/actuator A that receives time-difference of arrival (TDOA) information from a time-difference of arrival processor (TDOAP) that processes jointly two signals supplied by a pair of acoustic sensors, SX and SY. It is assumed that an acoustic source is positioned at location S.

When an object of interest, such as a vehicle, has been detected in the region under surveillance, the estimated angle of arrival (line of bearing) can be utilized by each security camera for aiming and zooming, in order to enhance the quality of recorded images. Furthermore, the information about the angles of arrival obtained from the surveillance units can be processed jointly to determine the object's location. In this case, the surveillance units can be viewed as the nodes of a distributed sensor network supplying information to a higher-order data fusion centre. It is assumed that there is provided a communication channel in the form of a wired or wireless link, available for information exchange between the surveillance units and the data fusion centre.

In some applications, an object may carry itself a source of a wideband signal so "engineered" as to facilitate detection and localization in multi-user environments. For example, a source of a suitable ultrasonic signal can be used for covert operation performed to identify and localize an object of interest, such as a vehicle, vessel, cargo container or person.

First Preferred Embodiment

Figure 6:
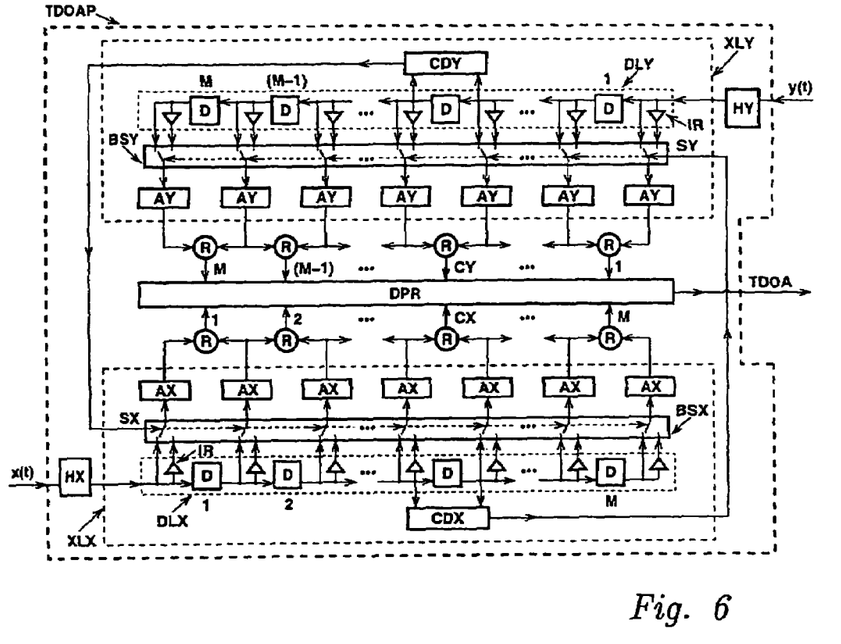
FIG. 6 is a block diagram of a crosslation-based time-difference of arrival (TDOA) processor arranged to operate in accordance with the invention.

FIG. 6 is a block diagram of a time-difference of arrival (TDOA) processor (TDOAP) arranged to operate in accordance with the invention and suitable for use in the network of FIG. 4. The processor comprises two hard limiters, HX and HY, two interconnected crosslators, XLX and XLY, two arrays of identical difference circuits, R, and a data processor DPR.

The crosslator XLX comprises a cascade DLX of M unit-delay cells D, a bank of switches BSX, (M+1) identical averaging (or integrating) circuits AX and a zero-crossing detector CDX. Each delay cell D can supply both a signal and its polarity-reversed replica.

Similarly, the crosslator XLY comprises a cascade DLY of M unit-delay cells D, a bank of switches BSY, (M+1) identical averaging (or integrating) circuits AY and a zero-crossing detector CDY. Each delay cell D can supply both a signal and its polarity-reversed replica.

Two input signals, x(t) and y(t), to be processed jointly by the time-difference of arrival processor (TDOAP), are first converted into corresponding bipolar binary waveforms in respective hard limiters, HX and HY, and then the resulting binary waveforms propagate in opposite directions (counter-propagate) through respective delay cascades, DLX and DLY.

The crosslators XLX and XLY are crosscoupled: the detector CDX of the crosslator XLX supplies trigger pulses SY to the switch bank BSY of the crosslator XLY, and the detector CDY of the crosslator XLY supplies trigger pulses SX to the switch bank BSX of the crosslator XLX.

Figure 7:
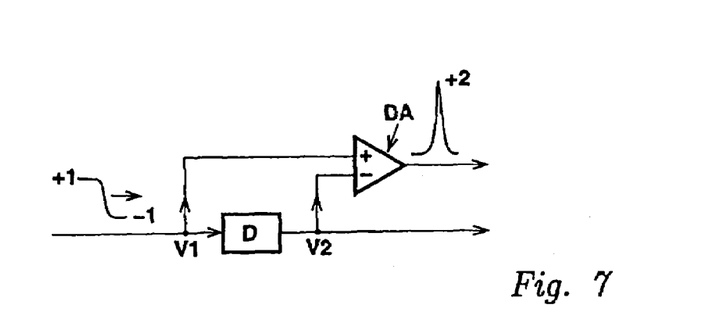
FIG. 7 illustrates the structure and operation of the zero-crossing detector used in the crosslation-based processor TDOAP.

Trigger pulses are produced by respective zero-crossing detectors, CDX and CDY. The operation of the zero-crossing detector (CDX or CDY) will be explained with reference to FIG. 7. When there is no transition in the binary waveform propagating through the delay cell D used by the detector, the input voltage level V1 is the same as the output voltage level V2. Therefore, the output of a differential amplifier DA driven by V1 and V2 remains at zero level. However, when a steep rising edge appears at the input of cell D, there is a short time interval (equal to the unit delay D) during which V1=+1 and V2=−1; as a result a positive transient pulse of peak value 2 appears at the output of the amplifier DA. Similarly, when a steep falling edge appears at the input of cell D, there is a short time interval D during which V1=−1 and V2=+1, and a transient pulse of negative peak value −2 appears at the output of the amplifier DA. Preferably, each hard limiter, HX and HY, will produce a binary waveform with switching times less than (or, at most equal to) the unit-delay time of the cell D.

Separately, the two crosslators, XLX and XLY, operate in the same manner as that disclosed in U.S. Pat. No. 6,539,320. However, for the reasons set out below, difference circuits R are used to derive the differences between outputs of adjacent cells. Thus, for proper operation of the circuits R, both the input and the output of each delay cell D are connected to respective averaging circuits (AX or AY) via the corresponding bank of switches (BSX or BSY). Therefore, although each crosslator employs M unit-delay cells, the number of averaging circuits (and switches in each bank) is equal to (M+1).

Figure 5A:
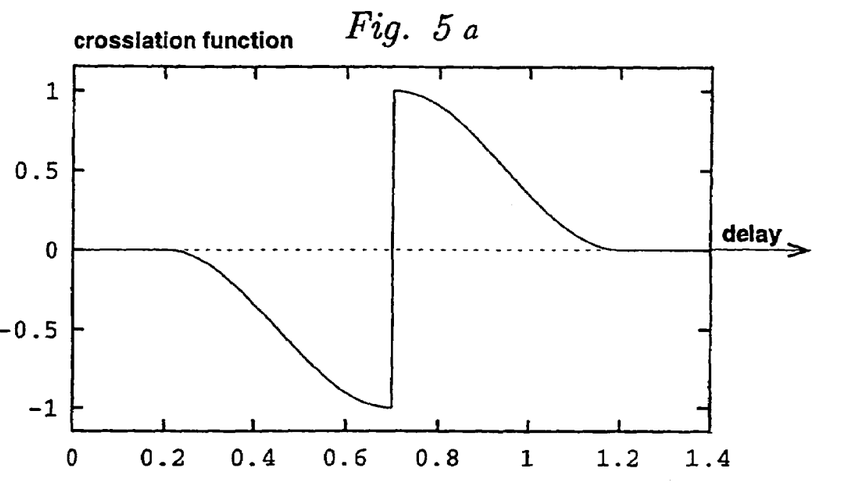
FIG. 5a depicts a theoretical crosslation function.
Figure 5B:
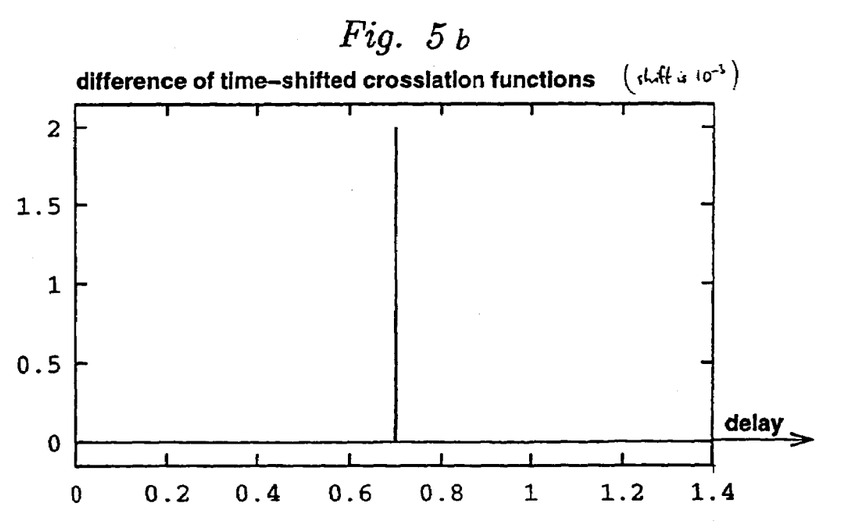
FIGS. 5b and 5c show on a larger scale the difference between the crosslation function of FIG. 5a and its replica shifted by 0.001 of the time unit.
Figure 5C:
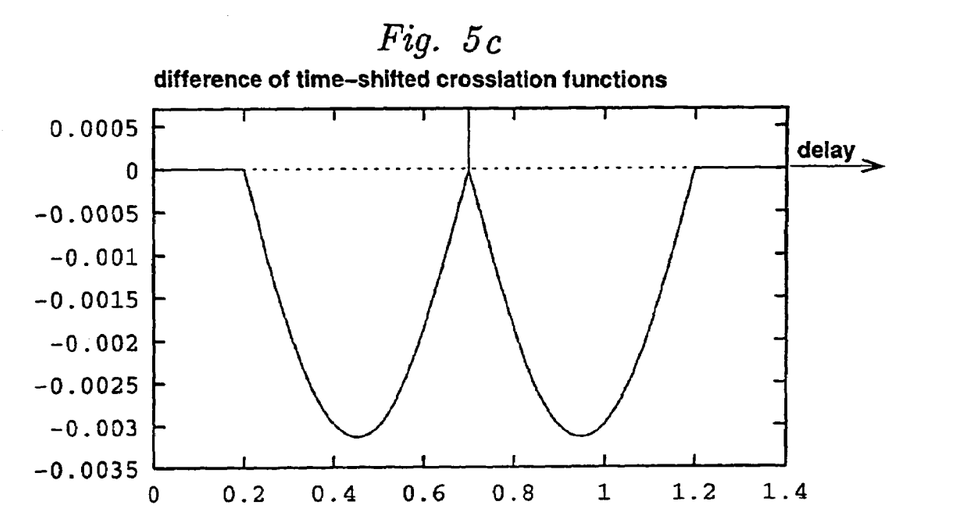

By using the difference circuits R, each crosslation function is converted into a unipolar impulse-like function. The advantages of such a conversion will be explained in more detail with reference to FIG. 5.

An example of a theoretical crosslation function is shown in FIG. 5a. This particular shape corresponds to the case of a binary waveform obtained from zero crossings of Gaussian noise with a low-pass frequency spectrum of the shape of a Gaussian function. The properties of the crosslation function characterizing random binary waveforms are discussed in more detail in: W. J. Szajnowski and P. A. Ratliff, Implicit Averaging and Delay Determination of Random Binary Waveforms, *IEEE Signal Processing Letters*. 9, 193-195 (2002), the contents of which are incorporated herein by reference.

As shown in the above publication, in the case of an ideal binary waveform with zero switching times between the two levels, the crosslation function always has a step corresponding to the delay instant, irrespective of the characteristics of the binary waveform. Therefore, the derivative of the crosslation function will always have a dominant component in the form of the Dirac delta function. In practical implementations, the time derivative may conveniently be substituted by a difference between a crosslation function and its replica suitably shifted in time.

FIG. 5b and FIG. 5c show (to different scales) the difference between the crosslation function of FIG. 5a and its replica shifted by 0.001 of the time unit. As seen, the peak value of the difference, corresponding to the unknown delay, is equal to 2, and the magnitude of the off-peak negative sidelobes (shown in detail in FIG. 5c) does not exceed the value of 0.0032. Therefore, in this case, the ratio of the peak-to-sidelobe is greater than 625. The value of this ratio tends to infinity as the delay used for the difference determination approaches zero. Accordingly, precise detection of the point representing the time delay is rendered easier.

As a result of the combined effect of binary waveform counterpropagation and crosscoupling of the component crosslators, when the two input signals, x(t) and y(t), are undistorted time-delayed replicas of a common signal s(t), the steps of the two respective crosslation functions will appear at the same "geometrical" location along the two rows of averaging circuits, i.e. the steps will "face" one another. More specifically, this statement applies to the two extreme values that define the crosslation step rather than to the step itself.

Because, as shown in FIG. 6, the difference circuits R operate on the outputs of adjacent averaging circuits, the impulses corresponding to the crosslation steps will appear at the same "geometrical" location along the two respective arrays of difference circuits R. Therefore, the location at which these impulses coincide will determine the value of unknown time-difference of arrival (TDOA).

For example, when the two input signals, x(t) and y(t), are identical with zero mutual delay, the impulses corresponding to the crosslation steps will appear coincidently at central locations CX and CY, shown in FIG. 6. When x(t) is delayed with respect to y(t), i.e. y(t) is advanced with respect to x(t), the impulse coincidence will take place in a specific location on the left side of the arrays of difference circuits; for example, it may occur at output (M−1) of the upper array and at corresponding output 2 of the lower array. Similarly, when y(t) is delayed with respect to x(t), i.e. x(t) is advanced with respect to y(t), the impulse coincidence will take place in a specific location on the right side of the arrays of difference circuits; for example, it may occur at output 1 of the upper array and at corresponding output M of the lower array.

Thus, each of the array outputs of crosslator XLY is derived by delaying the zero-crossings in signal x(t), relative to the signal y(t), by a predetermined amount, and is combined with a corresponding one of the outputs from the crosslator XLX which is derived by delaying the zero-crossings in signal y(t), relative to the signal x(t), by the negative of that predetermined amount. That is, corresponding array outputs are associated with the same delay of x(t) relative to y(t).

In the presence of noise and other interference, and also due to imperfections of physical circuitry, the crosslation function will always exhibit a non-zero transition region rather than a steep step in the centre. Accordingly, the resulting difference will differ from a single impulse and it may appear in a few adjacent difference circuits. This effect is illustrated in FIG. 8, which depicts some selected experimental results.

Figure 8A:
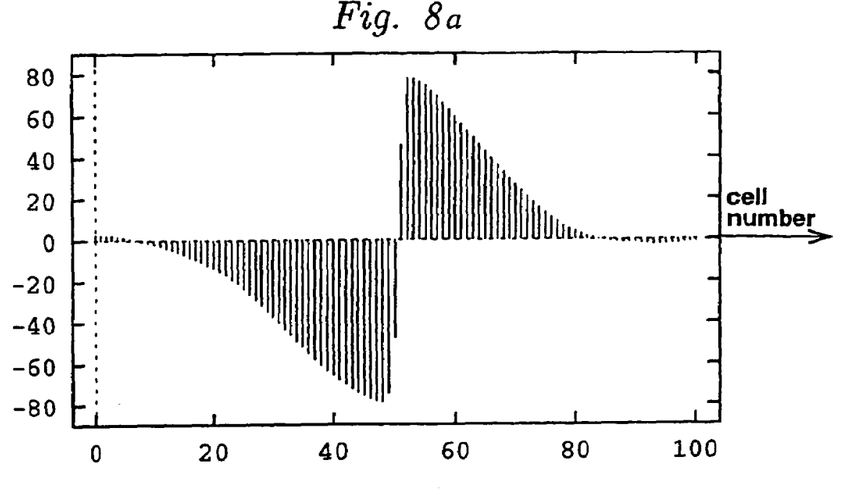
FIG. 8a is an example of a discrete representation of an empirical crosslation function.
Figure 8B:
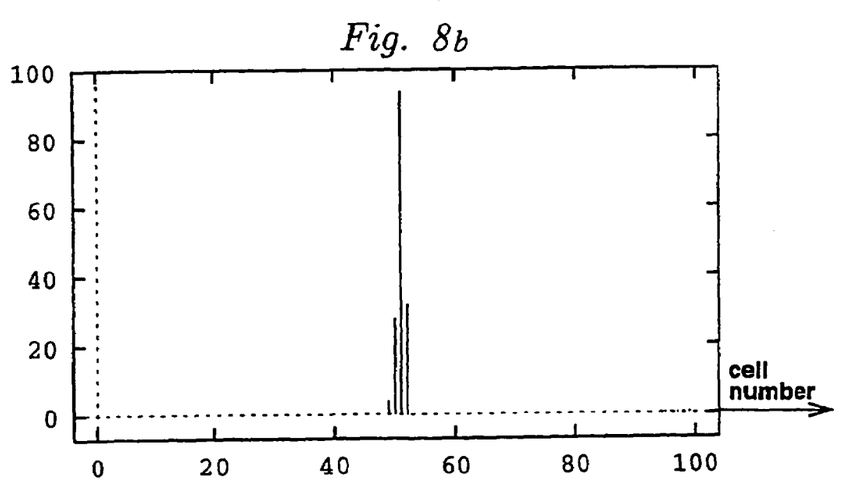
FIG. 8b shows the difference between the two replicas of the empirical crosslation function shifted by a unit step.

FIG. 8a is an example of a discrete representation of an empirical crosslation function, and FIG. 8b shows the difference between the two replicas of the empirical crosslation function shifted by a unit step (a single cell). As seen, in addition to a dominant main peak there are also some positive sidelobes on its either side. However, the location of the main peak can be determined by applying a suitable decision threshold to calculated difference values.

According to a further aspect of the invention, the values produced by the two arrays of difference circuits R are supplied to a data processor DPR that uses a predetermined detection threshold in order to declare the presence of a common component signal in the input signals x(t) and y(t). Next, the processor DPR determines the locations of the impulses along the arrays of the difference circuits to calculate the value of time-difference of arrival (TDOA). The location of the impulse centre can be determined from the peak value, the "centre of gravity" or the median of the impulse. Operations required to perform such tasks can be implemented by anyone skilled in the art.

In order to determine the basic parameters of a crosslation-based time-difference of arrival (TDOA) processor, consider the following example:

EXAMPLE

Consider the sensor geometry depicted in FIG. 1 and assume that the distance L between sensors SX and SY is equal to 5 cm, and the angular field of view (FOV) of each sensor is limited by −60°<θ<60°; also assume that the required angular resolution $\beta$ at zero bearing ($\theta=0$) is equal to $\beta=1°$. Hence, the maximum value of time-difference of arrival (TDOA) can be determined from the sensor geometry as $$|\tau_{max}| = \frac{L\sin 60°}{v_s} \approx 127.4 \text{ μs}$$

where $v_s$=340 m/s is the speed of sound; the required time resolution $\Delta\tau$ is $$\Delta\tau = \frac{L\sin 1°}{v_s} \approx 2.6 \text{ μs}$$

Therefore, for the design purposes, it can be assumed that $\Delta\tau$=2.5 μs. Consequently, each delay line will consist of 103 delay cells, each introducing a delay of 2.5 μs, which results in a total delay of 257.5 μs.

When cell number 52 is selected to be the centre cell, the range of available delays will be ±127.5 μs. For optimum system operation, the rise time and the fall time of binary waveforms produced by hard limiters should be less than 2.5 μs.

The disclosed time-difference of arrival (TDOA) processor:

- utilizes concurrently trigger pulses obtained from one of the signals x(t) and y(t) to synchronize the analysis of the other signal, and trigger pulses obtained from the other signal to synchronize the analysis of the first signal (crosscoupling of the component crosslators). This significantly reduces the effects of uncorrelated noise in the two signals;
- employs binary waveforms, rather than pulses, for conveying and propagating the timing information along the respective delay lines;
- combines upcrossings and downcrossings of the processed signals in such a manner as to counterbalance the effects of crossings of the same and opposite kinds, thereby producing a zero output for two purely random independent input signals;
- uses each trigger pulse to take two samples separated in time by a short interval, and then calculates the difference between these samples; accordingly, the processor derives an output which is effectively the time derivative of the crosslation function.

Second Preferred Embodiment

The difference between two delayed replicas of a crosslation function can be obtained through the use of an auxiliary circuit following each of the two zero-crossing detectors, and without the use of any explicit difference circuits.

Figure 9:
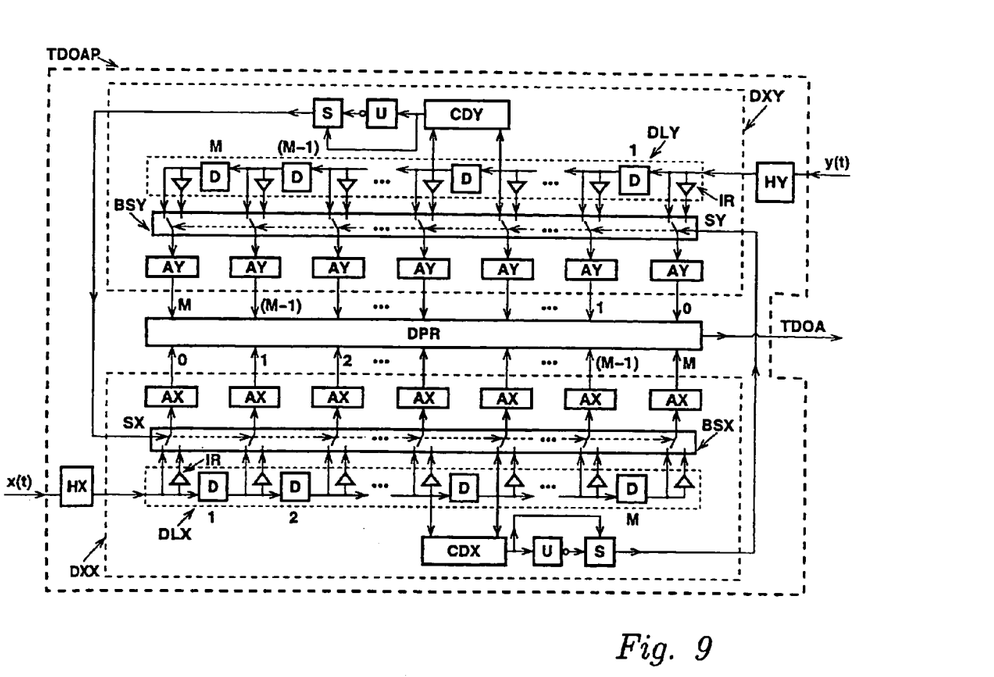
FIG. 9 is a block diagram of a modified crosslation-based time-difference of arrival (TDOA) processor arranged to operate in accordance with the invention.

FIG. 9 is a block diagram of a modified time-difference of arrival (TDOA) processor (TDOAP) arranged to operate in accordance with the invention and also suitable for use with the network of FIG. 4. The processor comprises two hard limiters, HX and HY, two crosscoupled modified crosslators, DXX and DXY, and a data processor DPR. Each of the zero-crossing detectors, CDX and CDY, is followed by an auxiliary delay unit U and a summer S.

When a rising edge (a zero upcrossing) is detected, the positive pulse is produced at the zero-crossing detector's output. Because this pulse is delayed and inverted by the auxiliary delay unit U, the summer S will produce a pulse doublet comprising a primary positive pulse followed shortly by its negative replica. Similarly, when a falling edge (a zero downcrossing) is detected, the negative pulse produced at the detector's output is delayed and inverted by the auxiliary delay unit U, so that the summer S will produce a pulse doublet comprising a primary negative pulse followed shortly by its positive replica.

Accordingly, in response to detection of a single zero crossing, the respective bank of switches will transfer to the averaging circuits a sampled representation of the binary waveform followed by a delayed and reversed replica of such representation. As a result, each array of averaging circuits (AX and AY) will produce directly the difference between a respective crosslation function and its replica delayed by the amount introduced by the auxiliary delay unit U.

Other functions and operations performed by the modified time-difference of arrival processor (TDOAP) are equivalent to those of the time-difference of arrival processor (TDOAP) of FIG. 6.

The modified time-difference of arrival processor (TDOAP) of FIG. 9 can offer the following specific advantages:

- no difference circuits are required;
- the delay introduced by the auxiliary delay unit U may differ from the unit delay of delay cell D; accordingly, a better approximation of the derivative can be obtained for auxiliary delays less than that of cell D.

The apparatuses described above detect events by sensing zero upcrossings and downcrossings. It would instead by possible to detect events occurring at other levels (upcrossings and/or downcrossings). The multi-tapped delay lines DLX and DLY can transmit digital (e.g. binary) data or analog data.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method of measuring the amount by which signals are delayed with respect to each other, the method comprising:
    deriving from each signal a succession of events which are spaced apart by irregular intervals;
    using the events from each signal to trigger the sampling of the other signal;
    shifting the two signals with respect to each other by different time values, and for each time value:
    repeating the sampling and combining the samples from the two signals to derive a value which is influenced by the number of times the sampling has substantially coincided with parts of the sampled signals which correspond with respective events; and
    selecting on the basis of the derived values the value of the time shift associated with the greatest degree of coincidence.

2. A method as claimed in claim 1, wherein each event is used to trigger the taking of first and second samples of the sampled signal, and wherein the step of combining results in the derivation of a value representing the sum of the differences between the first and second samples triggered by each event.

3. A method as claimed in claim 1, wherein the succession of events is derived by detecting zero crossings of a bipolar signal.

4. A method as claimed in claim 1, wherein the succession of events is derived by detecting level upcrossings and level downcrossings.

5. A method as claimed in claim 1, wherein each signal is derived from a respective sensor.

6. A method as claimed in claim 1, the method further including the step of calculating, from said delay, a bearing of an object generating or influencing the signals sensed by the sensors.

7. A method of measuring the amount by which signals are delayed with respect to each other, the method comprising:

deriving from a first of the signals a succession of events which are spaced apart by non-uniform intervals;

using each event to trigger the taking of first and second samples of the second signal;

shifting the two signals with respect to each other by different time values, and for each time value:

deriving a value representing the sum of the differences between the first and second samples triggered by each event, the value being influenced by the number of times the sampling has substantially coincided with parts of the second signal which correspond with respective events; and selecting on the basis of the derived values the value of the time shift associated with the greatest degree of coincidence.

8. A method as claimed in claim 7, wherein the succession of events is derived by detecting zero crossings of a bipolar signal.

9. A method as claimed in claim 7, wherein the succession of events is derived by detecting level upcrossings and level downcrossings.

10. A method as claimed in claim 7, wherein each signal is derived from a respective sensor.

11. A method as claimed in claim 7, the method further including the step of calculating, from said delay, a bearing of an object generating or influencing the signals sensed by the sensors.

* * * * *